Figure 1:
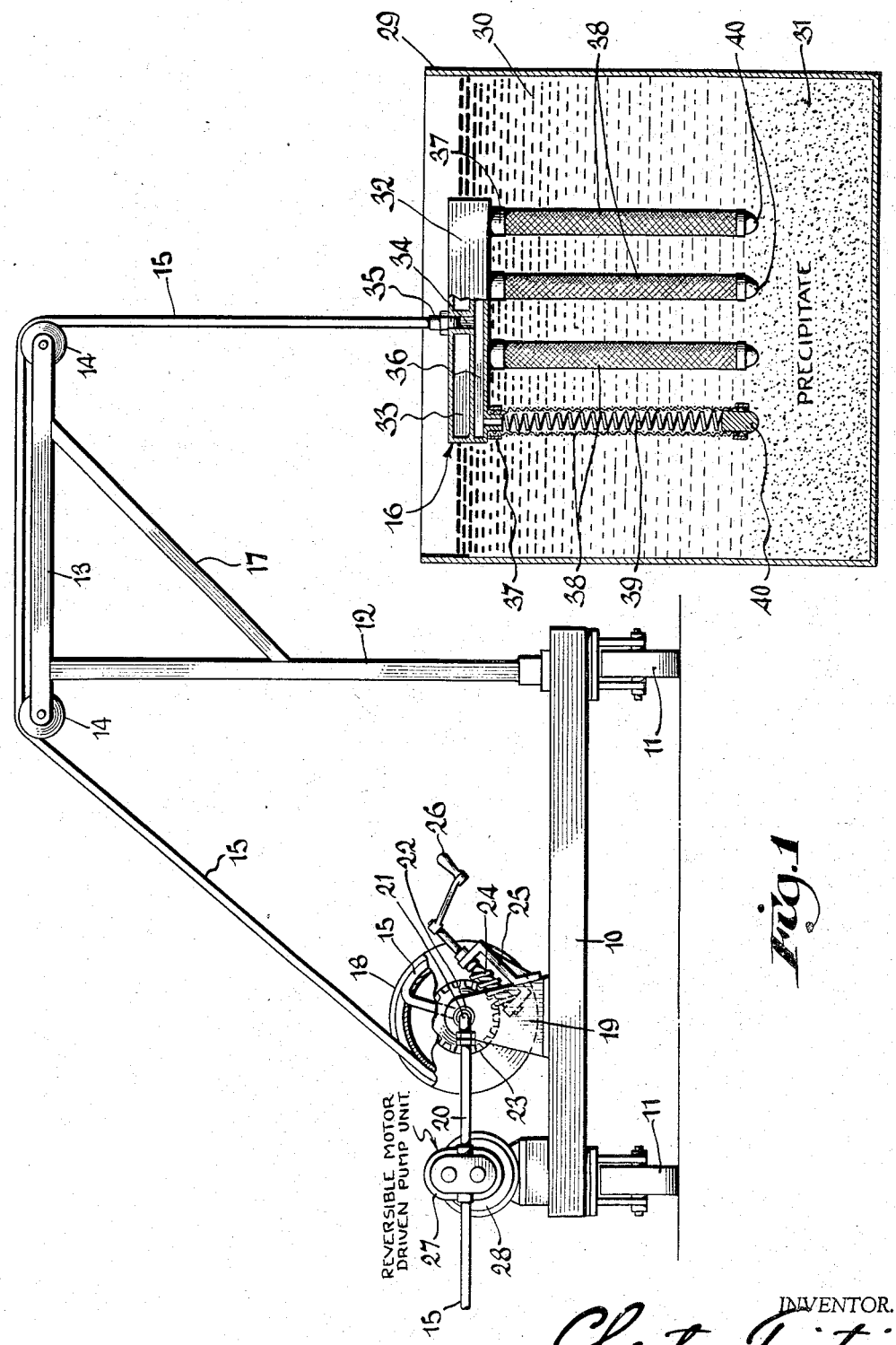

July 25, 1944.    C. TIETIG    2,354,623

SOLUTION FEEDING OR DECANTING APPARATUS

Filed Aug. 6, 1941

INVENTOR.
Chester Tietig

Patented July 25, 1944

2,354,623

UNITED STATES PATENT OFFICE 2,354,623

SOLUTION FEEDING OR DECANTING APPARATUS

Chester Tietig, Covington, Ky.

Application August 6, 1941, Serial No. 405,685

6 Claims. (Cl. 210—154)

This invention relates to an apparatus which is useful for chemical feeding of solutions or gases, the decantation of liquids or their filtration.

Among the objects of the invention are the provision of a simple, portable apparatus adapted to serve a plurality of chemical tanks or vats which may be of varying height or liquid depth. Another object is to provide an apparatus which can be interchangeably used with such vats or tanks either to feed or diffuse into liquids in such vats, other chemical solutions or gases with which they are to be reacted. Another object is to provide a filtration or feeding element which is maintained at a height in the solution which is governed by the top level of the solution. As the solution subsides, the filtration head can then follow the liquid level.

In the drawing, 10 is a platform of a truck which is shown as of the manually movable type, but may be automotive. 11 are the wheels or casters of said truck. 12 is the mast of a crane, the boom 13 of which is adapted to project over the vats or tanks in which it is desired to work. As illustrated, the crane 12—13 is of the rigid type, but I am not limited to such a construction. A movable boom may be employed.

14—14 are pulleys at the ends of boom 13 over which a reenforced rubber hose 15 passes. Attached to the end of hose 15 is a filtering or feeding unit 16. Since the weight of hose 15 plus the weight of the filtering unit 16 may be considerable, a supporting member 17 is preferably used between mast 12 and boom 13.

On the platform 10 there is a cylindrical hose reel 18 over which the hose 15 may be wound. The reel is supported rotatably on trunnions 19. Through one trunnion 19 there extends a pipe 20 which connects to the hose 15 through a pipe swivel joint 21 preferably of the Barco type.

Attached to the same axle 22 that supports reel 18, there is tightly attached a worm wheel 23 into which meshes a quick pitch worm 24 which is mounted in a bracket 25 attached to trunnion 19. A hand crank 26 is provided to rotate reel 18 by hand and to limit the length of the hose 15 which is payed out.

Hose 20 connects to the inlet or outlet of a reversible pump or blower 27. This pump or blower is driven preferably by an electric motor 28 although other means may be used to drive it. A second flexible hose 15 extends from the discharge of the pump to whatever receptacle or place it is desired to discharge solution or other liquid filtered into the filtering head 16.

The vat or tank in which it is desired to work is indicated by 29 and the solution therein by 30. 31 is a precipitate which for purposes of illustration is shown as having settled out of solution 30. From the position of the filtering or feeding head 16 it will be noticed that this head is adapted to work on the clear supernatant liquid first, thereby being able to handle a large amount of liquid before coming to the thicker parts of the solution or slurry which might clog the filter units. The apparatus is advantageous therefore that the bulk of any job of filtration is disposed of before the difficult part of the operation is started. This, it will be evident, makes for speed and efficiency in filtration so that the apparatus here shown really deserves the name of decanting apparatus since it is more than merely a filter.

The head 16 comprises a manifold portion 32 which is preferably made of stainless steel or rather corrosion resisting material such as ceramic ware. The manifold portion comprises an upper float chamber 33 through which a central passage 34 extends. The hose 15 is attached by a union 35 into passage 34. A lower passage 36 is the manifold proper and bears perforated projections 37 to which the filtering units proper can be attached. The latter 38 are woven cylinders of chemically resistant material. I prefer tubes of woven glass, say 5 or 6 inches wide and about 1 to 2 feet long, although I am not limited as regards dimensions. The tubular filtration units 38 may also be woven of steel wire or rubber covered ordinary wire or in general, any material which will give the desired porosity coupled with resistance to the liquid to be filtered. This includes canvas duck, Alundum or Carborundum tubes. The two latter materials have the advantage that their porosity can be easily restored by heating them to redness in a furnace, when organic material clogs the pores.

When woven flexible material is used, I insert into the tube 38 a coiled spring 39 made from stainless steel or other resistant material which may include coiled glass rod. The bottoms of tubes 38 are preferably weighted with weights 40 of a shape adapted to penetrate precipitates so as to promote good contact between the filtering unit and the material to be filtered.

I do not limit myself to tubular filtering units nor need my distending elements 39 be coils or springs. The float chamber of the manifold 32 may be omitted and the filtering head 16 may be suspended by an element other than a hose. The worm and worm wheel on reel 18 may be omitted. The pump 27 need not be reversible. the truck may be a stationary platform, the mobility being obtained entirely by the movement of the crane 12—13. The above changes are such as can be made without departing from the spirit of the invention.

In operation the truck 10 is first wheeled next to the vat 29 containing the material upon which it is desired to work. If filtration is desired, the filtering head 16 is first primed with the liquid by inserting the hose from the discharge end of the pump into the supernatant liquid 30 for a short time and running the pump 27 backward until it has filled the hose 15 and the filtering units full of the liquid. The system is thus primed for suction, after which the pump 27 is reversed and the free end of the hose 15 placed in the vessel to which it is desired to transfer the supernatant liquid 30. The size of the float chamber 33 is sufficient to float the entire head 16 including distenders and the liquid with which the head may be filled. A suitable amount of slack is preferably left in hose 15 near the reel 18 so that the head can gradually sink with the level of the liquid 30. If no float chamber 33 is provided, the reel 18 must be rotated by crank 26 to pay out sufficient hose so that the filtering head 16 does not become air bound. After all of the liquid 30 has been removed except for that which is contained in the precipitate, the filtering head 16 may be allowed to fall upon its side, thus lying parallel with the bottom of the vat 29. This will bring the precipitate in contact with a greater filtering area. The weights and distenders may be omitted but the filtering units should of course be closed at the bottom.

By reversing pump 27, my apparatus can be used as a feeder of liquids. For instance, the liquid 30 may be a bath of nitrating acid and the liquid to be nitrated may be pumped into the head 16 from whence it will diffuse out through the pores of the filtration units 38. If these pores are fine enough, other agitation may in certain cases be dispensed with. If the liquid 30 is water and it is desired to feed chlorine in regulated amounts into it, pump 27 should be substituted by a blower or chlorine should be fed through a reducing valve directly into hose 15 on the reel 18. For purposes such as water purification, 30 may be a running stream and 29 a conduit.

I claim as my invention:

1. A filtering machine comprising a pump, a reel located adjacent the pump, a crane located adjacent the reel and comprising a roller support arranged at an elevation above the reel, impervious flexible tubing wound upon the reel and extending over the roller support of the crane, a filtering head connected to the lower end of the flexible tubing depending from the crane adapted to be suspended in a liquid, said filtering head comprising an elongated tubular filtering unit composed of pervious flexible material, means for maintaining said unit in radial and longitudinally expanded condition, and means providing communication between the inside of the filtering unit and the tubing, means for rotating the reel to raise or lower the filtering head, and fluid-communicating means connecting said tubing and said pump through said reel.

2. A filtering machine comprising a pump, a reel located adjacent the pump, a crane located adjacent the reel and comprising a roller support arranged at an elevation above the reel, impervious flexible tubing wound upon the reel and extending over the roller support of the crane, a filtering head connected to the lower end of the flexible tubing depending from the crane adapted to be suspended in a liquid, said filtering head comprising an elongated tubular unit composed of pervious flexible material, means for maintaining said unit in radial and longitudinally expanded condition, and means providing communication between the inside of the filtering unit and the tubing, means for rotating the reel to raise or lower the filtering head, fluid-communicating means connecting said tubing and said pump through said reel, said last-mentioned means comprising a trunnion supporting one end of the reel, a coupling having swivel connection with said trunnion, a conduit extending between said pump and coupling, and a conduit extending between said coupling and the tubing wound upon the reel.

3. A filtering machine comprising a pump, a reel located adjacent the pump, a crane located adjacent the reel and having a horizontal arm adapted to overhang a tank of liquid and providing a roller support, said pump, reel and crane being mounted upon a truck so as to be transported from one tank to another, impervious flexible tubing wound upon the reel and extending over the roller support of the crane, a filtering head connected to the lower end of the flexible tubing depending from the crane adapted to be suspended in the liquid contained within said tank, said filtering head comprising an elongated tubular unit composed of pervious flexible material, means for maintaining said unit in radial and longitudinally expanded condition, and means providing communication between the inside of the filtering unit and the tubing, means for rotating the reel to raise or lower the filtering head and fluid-communicating means connecting said tubing and said pump through said reel, said last-mentioned means comprising a trunnion supporting one end of the reel, a coupling having swivel connection with said trunnion, a conduit extending between said pump and coupling and a conduit extending between said coupling and the tubing wound upon the reel.

4. A filtering machine comprising a pump, a reel located adjacent the pump, a crane located adjacent the reel and having a horizontal arm adapted to overhang a tank of liquid and providing a roller support, impervious flexible tubing wound upon the reel and extending over the roller support of the crane, a filtering head connected to the lower end of the flexible tubing depending from the crane adapted to be suspended in the liquid contained within said tank, said filtering head comprising a manifold chamber communicating through its top with the tubing, a plurality of perforations in the bottom of said chamber, a plurality of elongated tubular filtering units composed of pervious flexible material, each communicating at its upper end with said chamber through a perforation and having a weighted closure member closing its lower end, and a coil spring disposed within and maintaining each of said filtering units in radial and longitudinally expanded condition, a worm-wheel secured to said reel, a worm engaging said worm-wheel, and means for turning said worm for rotating said reel to raise or lower the filtering head and fluid-communicating means connecting said tubing and said pump through said reel, said last-mentioned means comprising a trunnion supporting one end of the reel, a coupling having swivel connection with said trunnion, a conduit extending between said pump and coupling and a conduit extending between said coupling and the tubing wound upon the reel.

5. A filtering machine as set forth in claim 4 having a neck upon the filtering head surrounding each of said perforations, said neck being of a size adapted to receive the upper end of a tubular filtering unit, and a collar adapted to fit onto said neck and tightly clamp the filtering unit in engagement with said neck.

6. A filtering machine as set forth in claim 4 in which the pump is of the reversible type.

CHESTER TIETIG.